March 2, 1954

D. T. BALL 2,670,814

SHOCK ABSORBER

Filed May 29, 1951

INVENTOR.
Donald T. Ball
BY
Harness and Harris
ATTORNEYS

March 2, 1954 D. T. BALL 2,670,814
SHOCK ABSORBER
Filed May 29, 1951 4 Sheets-Sheet 2

INVENTOR.
Donald T. Ball.
BY
Harness and Harris
ATTORNEYS

March 2, 1954 D. T. BALL 2,670,814
SHOCK ABSORBER
Filed May 29, 1951 4 Sheets-Sheet 3

INVENTOR.
Donald T. Ball.
BY
Harness & Harris
ATTORNEYS.

Fig. 15.

Resistance Reduction Effected By Compression Relief Valve Means

| Maximum Piston Vel. in Ft. Per Sec. | Cycles Per Min. | % Reduction |
|---|---|---|
| .65 | 50 | 0 |
| .985 | 75 | 4.0 |
| 1.315 | 100 | 26.7 |
| 1.64 | 125 | 36.5 |
| 1.97 | 150 | 40.5 |
| 2.3 | 175 | 43.5 |
| 2.63 | 200 | 44.5 |

INVENTOR.
Donald T. Ball.
BY
ATTORNEYS.

Patented Mar. 2, 1954

2,670,814

UNITED STATES PATENT OFFICE 2,670,814

SHOCK ABSORBER

Donald T. Ball, Oak Park, Mich., assignor to Chrysler Corporation, Highland Park, Mich., a corporation of Delaware Application May 29, 1951, Serial No. 228,835

1 Claim. (Cl. 188—88)

This invention relates to shock absorbers, and more particularly to improvements in hydraulic shock absorbers of the direct acting telescopic type commonly employed to control relative movement between the sprung and unsprung masses of a motor vehicle.

My invention provides improvements in the functional characteristics and performance of shock absorbers generally similar in a broad sense to those set forth in the copending application of Ross E. Lewton and Donald T. Ball, Serial No. 166,958, filed June 8, 1950. However, my present invention provides improvements in the structure and functioning of shock absorbers over those set forth in said copending Lewton et al. application.

It is an object of my invention to provide a shock absorber which will function to provide improved riding comfort relative to ride characteristics of presently known shock absorbers used for example on passenger automobiles, trucks, and buses. In addition, my shock absorber provides a smoother, steadier ride with improved vehicle stability and safety over all types of roads.

Another object is to provide a shock absorber having improved simplicity of construction and assembly such that my shock absorber may be manufactured at relatively lower cost. Furthermore, my shock absorber has improved durability whereby it will perform efficiently in normal service over longer periods of use than is experienced with conventional shock absorbers.

Additional objects are to provide a shock absorber employed with improved effectiveness and simplification certain of the teachings disclosed in said copending application of Lewton et al. and to provide a shock absorber having improved characteristics of low cost manufacture, simplicity, long life, and ease of assembly.

A further object is to provide a shock absorber of improved damping efficiency and smoothness while at the same time protecting the parts of the shock absorber and its mountings in an improved manner against damage incident to severe action tending to produce excessive forces on such parts and mountings.

Heretofore it has been customary in commercial shock absorbers of the direct acting type which have been used in the industry for many years to provide damping for the compression and rebound movements by means of orifices with associated pressure relief valves. Resistance to movement of fluid is induced by relative movements of the piston and cylinder and in such devices the shock absorber resistance builds up rapidly to reach its maximum resistance immediately after the beginning of its stroke as determined by a conventional blow-off type of pressure relief valve, such maximum resistance remaining approximately constant throughout most of the stroke and then decreasing abruptly just prior to the end of the stroke when the reduced piston velocity allows the blow-off relief valve to again close under the rapidly diminishing pressure of the fluid subjected to movement of the piston. On compression strokes a check valve freely permits the pressure of the liquid in the rebound chamber to equal that in the compression chamber so that only that portion of the piston area which is equal to the rod cross-section is effective in producing compression resistance. Such arrangements introduce insufficient damping control, over the normal range of use, harshness in the ride, and jolting of the passengers.

A typical example of such conventional or prior types of shock absorbers which is referred to herein in contrast with my shock absorber is shown on pages 140 and 141 of "Chrysler 1940 Shop Manual" (D-8637), copyright 1940 by Chrysler Corporation, and also on pages 111 and 112 of "De Soto 1940 Shop Manual" (D-8636), copyright 1940 by Chrysler Corporation.

In addition, with the aforesaid conventional shock absorbers, approximately the same maximum resistance is attained in the shock absorber regardless of the velocity of piston movement for all degrees of shock absorber actions which open the blow-off valve. Hence the resistance developed by the shock absorber and the damping performed is not proportioned or effectively related to the velocity of the piston stroke either on the compression jounce stroke or on the rebound stroke. Such arrangements and methods of damping forces are inefficient and impose undesired limitations on speed, safety, and comfort in driving motor vehicles over varying types of roads, especially those having washboard surfaces, chuck-holes, gravel irregularities, or other deviations from the so-called smooth boulevard surface.

Among other objections to the aforesaid conventional shock absorbers are difficulty in calibrating the blow-off valves, noisy action of such valves especially under low temperature conditions experienced in winter, objectionable lag effect, and an undesirably long period of time in warming-up the oil in the shock absorber before reaching average normal conditions.

My invention has among its objects overcoming the aforesaid undesirable characteristics in conventional shock absorbers, and at the same time improving the structure and functions of the aforesaid Lewton et al. shock absorber. In contrast with prior devices, I employ a novel simplified means for effecting damping with improved efficiency and passenger comfort on both the compression and rebound strokes of the shock absorber.

By reason of my damping control the resistance developed by the shock absorber and the damping performed is proportioned and effectively related in an improved manner to the piston stroke velocity preferably on both the compression and rebound strokes. Instead of employing conventional damping action in which under all road conditions the damping resistance rises rapidly to a peak which is then maintained over most of the piston stroke, my damping provides a resistance which builds up smoothly and uniformly in an improved manner to a maximum corresponding generally to maximum piston velocity at substantially the mid-stroke of the piston and then falls off uniformly as the piston reaches the end of its stroke. This pattern of performance for my shock absorber is obtained for varying road conditions and for both of the compression and rebound strokes, the value of maximum resistance developed by the shock absorber being greater as the maximum piston velocity increases and in predetermined proportion to such increases. Thus the performance characteristics of my shock absorber for boulevard types of roads are fundamentally the same as those experienced on roads of varying degrees of roughness, the amount of resistance developed by the shock absorber automatically responding with improved simplicity and effectiveness to varying piston velocities induced by the forces imposed on compression and rebound strokes and at all times the resistance developed is free from objectionable abrupt variations which result from use of conventional blow-off valves or other means for bringing about abrupt changes in rate of increase or decrease of pressure of the fluid in the shock absorber and resulting abrupt changes in resistance.

An object of my invention, in its preferred embodiment, is to provide means of improved simplicity and effectiveness to relieve excessive resistance during relatively high piston velocities during compression strokes of the character which might otherwise have a destructive effect on the parts of the shock absorber and its mounting. With such arrangement as the piston velocity becomes greater, the developed resistance becomes greater. However, such resistance on compression does not increase in direct proportion with increase in piston velocity but rather with progressively lessening increments of resistance increase as the piston velocity increases in equal increments. At low piston velocities this resistance relief is preferably ineffective for practical purposes but for increasing piston velocities the resistance relief operates at a rate accelerating in its effectiveness as the piston velocities increase.

An additional object of my invention is to improve the efficiency of direct acting telescopic shock absorbers by maintaining the liquid working chambers filled at all times and thereby insuring against a lag effect commonly experienced in conventional shock absorbers. A lag effect is experienced by relatively free movement of the shock absorber piston prior to its operation on a volume of liquid in a working chamber and is the result of inadequate supply of the liquid to that chamber during preceding movement of the piston in its opposite direction. In addition to the virtual elimination of lag effect by my invention I furthermore provide improved efficiency of shock absorber action by utilizing more of the full area of the piston for action in developing resistance on the compression stroke. With my invention the liquid pressure in the rebound chamber is so controlled during compression strokes that the liquid pressure in the compression chamber acts effectively on substantially the full area of the piston, especially at relatively lower range piston velocities, whereby much more resistance is developed on compression than has been possible with conventional shock absorbers of the same size. My invention provides improvements over the aforesaid Lewton et al. application in simplifying and improving the control of resistance relief, when desired, by automatically progressively causing the liquid pressure in the rebound chamber to increase with increases in piston velocities during compression strokes such that in the higher ranges of compression piston velocities the liquid pressure differential across the piston becomes less pronounced as the compression piston velocities increase and consequently less and less of the full piston area is effectively acted on by the liquid pressure in the compression chamber thereby causing a progressively decreasing rate of resistance build-up as the compression piston velocities increase. This automatic control, where desired, accelerates in its effectiveness as compression piston velocities increase over the range of relatively high piston velocities and is of only relatively minor effectiveness or significance in the range of piston velocities between relatively high and low velocities while at low velocities this automatic control is ineffective from a practical standpoint. Such control is highly desirable as it affords maximum efficiency in developing compression resistance over the lower range of piston velocities while automatically lessening compression resistances developed over the higher ranges of piston velocities, the amount of resistance control being readily varied by altering the stiffness of the valve means but without necessarily requiring change either in the size or location of the liquid orifice controls associated with the piston and base check valving.

I have found that my shock absorber operates with such improved damping efficiency that, even though liquid pressures are not excessive, damping forces are developed which, as a practical matter especially in regard to desirability of employing more or less standard size of mounting studs, make it desirable to reduce the damping capacity of the shock absorber on compression in the ranges of relatively high piston velocities. While improved and satisfactory results both functionally and mechanically are obtained without employing my resistance relief feature, I usually prefer to incorporate such feature from the standpoint of minimizing the size of mounting studs for the shock absorber and in providing a shock absorber which can be manufactured with only ordinary attention and consideration to strength and weight of materials and distortion of parts. My resistance relief feature, when employed, is preferably associated only with the compression stroke as the intensity of rebound strokes is limited largely to the force of the suspension springing and the weight of the unsprung parts and is accordingly not subject to extremely high forces as are dealt with on compression when the vehicle strikes a large obstruction when travelling at high speed.

In carrying out the objects of my invention I provide a notch form of liquid orifice of such number, shape, and total area as to provide the desired characteristics of liquid resistance. This notch orifice is preferably, though not necessarily, employed to control both compression and rebound resistance and according to my illustrated embodiments of the principles of my invention may take the form of notches in the body of the piston and base valve seat or in the form of notches in a separate member associated with the piston and base valving.

In the aforesaid Lewton et al. application the orifice control between the compression chamber and the reservoir is shown as being provided by a passage of small diameter drilled through a brass plug. My invention avoids the necessity of employing brass or other expensive and sometimes scarce materials or of difficult and expensive drilling of any character whereby this portion of the control is greatly simplified, reduced in cost of manufacture, and functionally improved. In addition, my invention accommodates manufacture under ordinary methods to closer limits so that consistency in performance of quantities of shock absorbers is more readily obtained.

In the aforesaid Lewton et al. application the control of liquid flow between the chambers above and below the piston is effected by the formation of small diameter passages through the piston. Here again my invention provides for greatly lessened cost of manufacture together with improved functioning of liquid flow and overall shock absorber performance. In addition, my invention provides for a substantial lessening, if not elimination from a practical standpoint, of liquid flow noises of the type which might disturb an occupant of a vehicle equipped with shock absorbers, my notch liquid passage means being arranged to direct the liquid streams toward the walls of the working cylinder at the piston location and toward each other at the base valve location. Such arrangement furthermore minimizes harshness which is felt to an undesired degree in prior shock absorbers and avoids high velocity liquid jets impinging toward the check valve. With my invention the check valve has improved freedom of action in insuring complete filling of the compression chamber thus avoiding lag effects and increasing the smoothness and general efficiency of the shock absorber action, this feature contributing to efficient filling of the rebound chamber during compression strokes as the rebound chamber starts to fill, without lag, as soon as the piston starts its compression strokes.

Further objects and advantages of my invention will be more apparent from the following description thereof which serves to illustrate the principles involved, reference being made to the accompanying drawings in which.

In the drawings the shock absorber C of Figures 1 through 5 and the shock absorber C' of Figures 6 through 10 may be used to advantage with any type of wheel suspension and, in the broader aspects of the invention with other mechanisms and devices wherein damping of relatively movable bodies is desired. In applying the improved shock absorber to motor vehicles, it is only necessary to connect operably the opposite ends of the telescopic assembly respectively to two parts of the vehicle, one part moving in response to rise and fall of the ground wheel, and the other part moving in response to rise and fall of the body or frame such that relative movement between the parts is under damping control by the shock absorber. A typical application of my shock absorber is illustrated in the aforesaid Lewton et al. application for both a front and rear wheel suspension of a motor vehicle. My shock absorber C or C' is so constructed and proportioned as to provide what may be termed generally optimum results, it being apparent that deviations therefrom may be undertaken as may be desired without departing from the principles of my invention as set forth herein and as defined in the appended claims. As a typical representation of these principles I have shown a front shock absorber which could effectively and to advantage replace the front shock absorber shown in said Lewton et al. application.

With reference particularly to Figures 1–5 of the drawings, the shock absorber C comprises an assembly of tubular parts having operating loops or eyes 15 and 16 at its opposite ends. The eye 15 is mounted to the one relatively movable vehicle part 17 which may be a stud, a rubber bushing 18 being disposed between the eye and the stud. The eye 16 is similarly mounted to the other relatively movable vehicle part 19 which may be a stud, a rubber bushing 21 being disposed between the eye and the stud. Shock absorber C comprises upper body member 26 having an axial bore 27 through which the working piston rod 28 is slidably fitted, the latter mounting the eye 15 at its upper end. Adjacent this eye the rod 28 is shouldered to receive the centrally apertured stamped end cover 29, the eye, rod, and cover being structurally united by a weld 30. Depending from the body 26 in spaced relation with rod 28, is a tubular working cylinder 31 having its upper end press-fitting the shouldered cylindrical portion 32 of body 26. The body 26 has a spherical portion 33 fitting within the spherical cap member 34 welded to the upper end of the outer tubular cylinder 35 which is radially spaced from cylinder 31 to provide a reservoir D for the working liquid of the shock absorber. Any of the well known commercial or other suitable shock absorber fluids may be used as the working liquid in the instant shock absorber.

Figures 1, 2, 3, 4, 5:
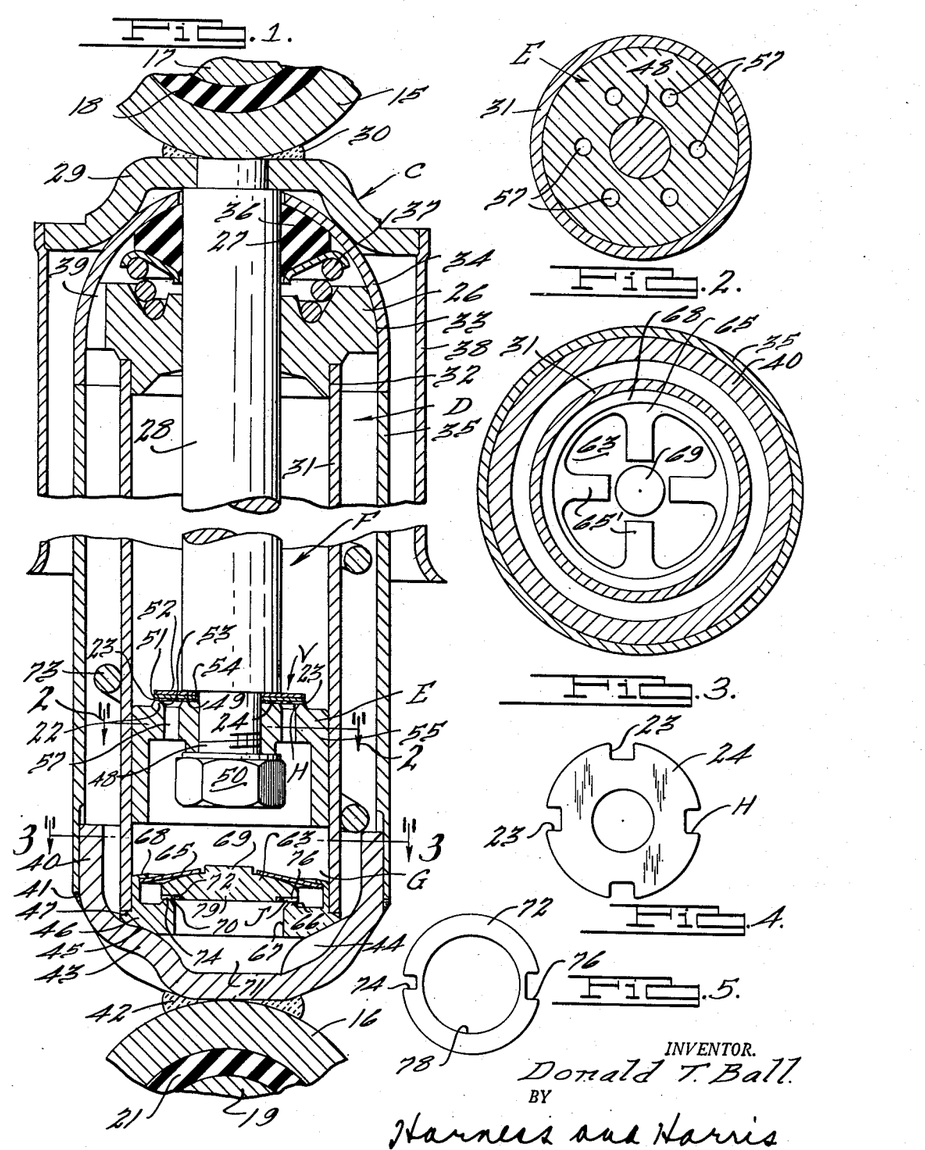
Fig. 1 is a sectional elevational view through my shock absorber shown at approximately double scale size.
Fig. 2 is a sectional plan view taken along line 2—2 of Fig. 1 across the top of the piston.
Fig. 3 is a sectional plan view of the base valving taken as indicated by line 3—3 of Fig. 1.
Fig. 4 is a plan view of the notch passage or orifice member associated with the piston in Fig. 1.
Fig. 5 is a plan view of the notch escape or orifice member associated with the base valve of Fig. 1.

The end cap member 34 is centrally apertured slidably to receive rod 28 with clearance and forms a secure assembly of tubes 32, 35 with the body 26. Escape of fluid is prevented by the oil-resistant flexible seal ring 36 seated within cap member 34 and fitting around rod 28, a compression coil spring 37 urging the seal ring into contact with the rod and cap member to prevent escape of liquid outwardly between the rod and cap, as more particularly described and claimed in the copending application of Fred Glassford, Serial No. 139,218, filed January 18, 1950. A tubular dirt shield 38 depends from the end cover 29 spaced outwardly from cylinder 35 to guard against mud and dirt being thrown against the upper end parts of the shock absorber, particularly the rod 28 and parts bounding the space between cover 29 and cap member 34. Any liquid passing upwardly between rod 28 and bore 27 is trapped beneath seal 36 and returns to reservoir D by the grooved passage 39 in the outer face of portion 33.

At the opposite or bottom end of the shock absorber, the cylinder 35 has its end portion tightly fitted around the upper end portion of the bottom cap member 40 and welded thereto at 41 to maintain a structurally unitary fluid-tight fit. The eye 16 is connected by weld 42 with the outer bottom closed face of the cap member 40. This cap, defining an interior chamber 71, has three relatively spaced regions of inward deformation as at 43 providing three relatively unrestricted passages for liquid within the cap member between the regions 43 as at 44. The cap member at regions 43 is formed to present a downwardly and inwardly sloping wall to seat a similarly faced annular flange 45 of an annular base valve carrier 46 which is stepped annularly at 47 to pilot and seat the bottom end portion of cylinder 31. It will be apparent that with the parts assembled as thus far described at the top and bottom of the shock absorber, the parts at the upper and lower end regions of the shock absorber will be maintained in assembled relation as shown.

The inner end of the main or primary portion of the piston rod 28 is reduced at 48 to receive a working piston E which is secured to the piston shoulder 49 thus formed by a fastener 50 threaded on the rod end 48. According to one embodiment of my invention laminated valve means of a novel form composed of a plurality of spring steel discs are clamped in position between shoulder 49 and the upper face of piston E. In the illustrated embodiment of Figures 1-5, this valve means, generally designated at V, comprises three thin spring steel disk or washer annulus members 51, 52, and 24, each having an opening for receiving rod portion 48. In the illustrated shock absorber the valve members 51 and 52 provide or control compression resistance relief and for the illustrated shock absorber were made .010 of an inch thick and the member 24 was made .0045 of an inch thick. The upper face of the piston E is provided with an upwardly open annular groove 53 of relatively large capacity for free or unrestricted liquid flow around the groove. This groove is spaced laterally outwardly of the rod portion 48 to provide a land 54 on which the inner annular portion of member 24 is seated, the outer annular portion of this valve member overlying groove 53 and seating on the outer piston land 22. The periphery of element 24 is notched by a plurality of notches 23, four in number, spaced circumferentially relative to one another and in the illustrated form were made .125 or one-eighth of an inch in width. A substantial or major portion of the radial length of each notch 23 overlies groove 53 so that the liquid orifice defined by each notch is the cross-sectional area of the notch above the piston land 22 such area being the product of the thickness of disk 24 times the width of the notch 23. The total area of the orifice thus formed is, of course, the sum of the areas of the notches employed in any instance. The rod shoulder 49 overlies a substantial portion of the groove providing support for members 24, 51, and 52 leaving only the portions of these members which extend laterally beyond shoulder 49 for flexing, as will presently become more apparent. Each of these annulus disk members 24, 51, and 52 is thus clamped or fixed at its inner peripheral portion to the piston leaving its outer peripheral portion free to flex away from the face of the piston bounding the rebound chamber F. While these valve members may, if desired, be subjected to pre-load when assembled, it is preferred for uniformity under manufacturing conditions to clamp these members in position such that member 24 is located flush with land 54, flexing of this member being resisted owing to its spring-like character but primarily by the resistance to flexing provided by the valve members 51 and 52. The four peripheral notches 23 on valve member 24 overlie the land 22 such that the periphery of member 24 covering groove 53 is interrupted at intervals. Extending through the piston head 55 and preferably on axes parallel to the piston axis for convenience of manufacture, is a single set of relatively large capacity cored liquid conducting passages 57 shown to be six in number equally spaced around the piston head for unrestricted free fluid flow therethrough, these passages opening upwardly to the groove 53 and downwardly to the space below the piston. It is to be observed at this point that the notches 23 in member 24 provide restricted liquid communication between opposite ends of the piston E. The radial penetration of each notch 23 toward the center of element 24 is sufficient that the minimum thickness of the resulting orifices is measured by the distance from the top of the land to the valve element 51, that is, by the relative thickness of element 24. Thus the orifice formed at each notch 23 is defined by the piston land 22, member 51, and notch 23.

The piston E has a sliding fit within cylinder 31 and serves to divide the working space within this cylinder into two chambers bounded by the opposite sides or working faces of the piston. The chamber F above the piston, with the shock absorber arranged as shown, is the rebound chamber and is defined by the volume bounded by the inner walls of cylinder 31, the inner surface of cylinder closure body 26 and the upper face of piston E or such parts as are exposed to the fluid. The chamber F is, of course, defined by its net cross sectional area which is the cross sectional area of the interior of cylinder 31 less the cross sectional area of piston rod 28 and the change in volume of chamber F, as piston E moves, is numerically equal to the product of this net cross sectional area of chamber F times the distance through which the piston moves.

The other of the two chambers defined by piston E comprises the jounce or compression chamber G defined by the volume bounded by the under portions of piston E, cylinder 31, and the upper surfaces of the chamber bounding valve carrier 46 and valve parts carried thereby, and more particularly hereinafter described. The chamber G is, of course, defined by its cross sectional area which is the cross sectional area of the interior of cylinder 31 and the change in volume of chamber G, as piston E moves, is numerically equal to the product of this cross sectional area of chamber G times the distance through which the piston moves.

In the particular shock absorber illustrated in Figure 1, the diameter of the piston rod 28 is approximately one-half inch and that of the bore of cylinder 31, and hence the approximate diameter of piston E, is substantially one inch. These dimensions are, of course, arbitrarily selected and are set forth merely by way of example for the size and capacity of the illustrated shock absorber when employed in the usual type of motor vehicle suspensions. These particular whole number dimensions are also of assistance for convenience of reference and discussion in illustrating the principles of the instant invention. For example, the ratio of cross sectional areas of chambers G and F is approximately 4:3 and as piston E moves, the chambers G and F vary in volume in this same ratio for a given piston movement.

As thus far described, it will be apparent in the improved shock absorber that on compression or jounce occasioned by a vehicle road wheel striking a bump in the road, the shock absorber eyes 15 and 16 will move relatively toward each other and the load spring of the suspension (not shown) will be deflected and loaded in addition to its static load. On rebound, as when the wheel recovers from its jounce movement and when a wheel falls away from the level into a hollow in the road owing to its own weight and that of its associated parts along with the force of its associated suspension spring, the eyes 15 and 16 will move relatively away from each other. Moving with the eye 15 are the piston rod 28 and parts attached thereto including piston E, cover 29, and shield 38. The remaining parts move with the eye 16. For convenience of reference in the specification and claims, the relative movement referred to will be in terms of relative movement of piston E, it being apparent that the shock absorber action occasioned by relative movement between cylinder 31 and piston E may be regarded as though cylinder 31 were fixed and all movement took place at eye 15 and piston E.

With the instant shock absorber providing rapid damping of oscillations with improved efficiency and better comfort to the vehicle passengers, it is not necessary or desirable to provide for quick build-up to a peak resistance maintained through most of the piston stroke in either of the compression or the rebound strokes as is common practice with conventional shock absorbers. Conventional shock absorbers rely on damping action over a relatively large number of oscillations or cycles between the sprung and unsprung masses attended by and, in fact in large measure caused by, an insufficient amount of work done by the shock absorber for each of its strokes. Conventional shock absorbers operate with this undesirable characteristic because, among other things, the resistance must be kept fairly low to prevent undue harshness for low velocity piston short strokes with the result that there is inadequate resistance provided for high velocity piston long strokes. Even with modern compromises the resistance in conventional shock absorbers is too great for short strokes and insufficient for long strokes and harshness and jolting is experienced for almost all ranges of operations. Furthermore, conventional shock absorbers do not damp oscillations quickly enough so that on rough roads amplitudes build up unduly thereby limiting vehicle safe driving speeds and failing to provide the desired degree of passenger comfort.

In contrast with conventional shock absorbers, the instant improvement overcomes the aforesaid disadvantages and undesirable characteristictics. The improved shock absorber operates by utilizing control passages for restricted flow of liquids, such passages being of a cross sectional area and number proportionate such that within the range of piston velocities experienced in automotive practice the resistance developed by the shock absorber varies proportionately with piston velocity as may be desired, the resistance being free from undesired abrupt changes throughout the piston stroke, and the pressures developed in the compression chamber G and rebound chamber F being increased and utilized in an improved manner in providing added resistance relative to pressure and resistance relationship in conventional shock absorbers.

In carrying out the objects of the present invention, there is provided a simple and effective form of liquid flow restricting shuttle passage means for restricted flow of fluid back and forth therethrough between chambers F and G when the piston moves in each direction of its reciprocatory stroke. Such shuttle passage means maintains these chambers in communication with each other so that the liquid flow resistance characteristic inherent by reason of the size, shape, and number of passages constituting such passage means provides the total resistance to fluid flow through such passage means when considered apart from the enlarging of this passage means by compression relief valving when employed according to certain of my embodiments. The fluid is thus shuttled back and forth through the open ends of the shuttle passage means in passing from one side of the piston E to the other side.

Apart from the outlet and inlet from and to chamber F provided by the shuttle passage means, the chamber F is otherwise closed during rebound, and where compression resistance relief is used such resistance is relieved by the valve means V during compression for certain piston velocities. However, because of the differential in volume change in chambers F and G occasioned by piston rod 28 disposed in chamber F, provision is made to accommodate escape of liquid displaced by rod 28 into reservoir D during the compression stroke and to accommodate unrestricted return of such liquid in an improved manner from the reservoir to chamber G on the rebound stroke to insure against cavitation developing in chamber G.

In the present embodiment of the invention, the shuttle passage means, conveniently designated H, is comprised by the notches 23 in the periphery of valve element 24, which insure communication between the passages 57 and chamber F at all times. The passages 57 are really more a part of chamber G than of the shuttle passage means H because passages 57 are of such large fluid conducting capacity as to freely pass liquid therethrough under all conditions of piston velocity. The lower ends of the passages 57 are, of course, freely open at all times to chamber G. Chamber G is provided with restrictive liquid escape means for controlling liquid escape from this chamber into the reservoir D. This escape means, according to the present illustrative embodiment of the invention, comprises a jounce or compression chamber liquid escape passage means illustrated in the form of notch escape passage means J between the chamber G and the reservoir D, the latter being freely open through passages 44 and the large diameter unrestricted passage 67 formed centrally through the body 46. The escape passage means J is shown in Figs. 1 and 5 in the form of notches 74 and 76 somewhat similar to the notches 23 previously discussed. Notch 76 in the illustrative embodiment shown in Figures 1-5 is of the same width as slots 23, namely, one-eighth of an inch, whereas notch 74 is one-sixteenth of an inch in width as such might be termed a half notch, as it were, since it is only half as wide as the notch 76. These notches are formed in a disc element 72 in the periphery thereof, which element 72 has a central boss-receiving opening 78. Element 72 is received on and is, in effect, a part of a plate check valve 63 by press fit, staking, or other suitable connection. This valve 63 is lightly yieldingly urged by a spider spring 65 toward an upstanding shouldered seat 66 bounding the unrestricted passage 67 formed in valve body 46 and concentrically arranged therewith. Spring 65 is secured in body 46 by peening the annular edge 68 of body portion 47 so as to overlie the annular margin of spring 65, the spring having spring fingers 65' engaging the upper face of valve 63 adjacent an upper boss 69 provided centrally thereon. An opposite boss 79 is formed on the lower side of valve 63 to provide an annularly stepped portion 70 on which is received in fixed relation therewith the notched element 72. This member or element 72 overlies the upstanding valve land 66, the notches 74 and 76 being adjacent thereto with the result that element 72 is annularly dicontinuous about the edges of land 66. The depth of radial penetration of notches 74 and 76 is sufficient so as to be spaced at their inner edge from land 66 an amount sufficient to insure that the minimum thickness of the notch passage defining the liquid restricting orifice is measured by the thickness of element 72. In the illustrated embodiment shown in Figures 1-5, the element 72 has a thickness of .0045 of an inch.

The escape passage means J has its entrance end defined by the notch and half notch 76 and 74, respectively, and has its discharge end adjacent the top of passage 67 for directly a liquid into the reservoir chamber D disposed between body 46 and the end member 43, the liquid streams being directed into passage 67 thence downwardly into the chamber 71 which communicates freely with the main annular reservoir D by passages 44. A spiral baffle member 73 is disposed in reservoir D to prevent liquid in the reservoir D from unduly surging and frothing or commingling with the air above the level of the liquid in the reservoir.

During the compression stroke of piston E when the latter moves toward valve carrier 46, valve 63 will remain seated and prevent any escape of liquid from chamber G to passage 67 except for that liquid which is compelled to flow through the escape passage means J to reservoir D. Liquid flow will take place upwardly to chamber F through the shuttle passage means H and where the resistance relief valving V employed a small amount of the liquid which will otherwise flow through the shuttle passage means H will, at certain piston velocities, be diverted to flow between disk 24 and valve seat 22 when liquid pressure in chamber G is sufficient to flex the group of disks 51, 52, and 24. However, rebound upward movement of piston E has a suction effect on check valve 63 and as this valve is only lightly held to its seat it readily unseats along with the element 72 and freely admits liquid from reservoir D to chamber G so as to maintain chamber G filled with liquid during rebound after which valve 63 again is caused to seat by spring 65 and by its own weight.

The shuttle passage means H is so proportioned in respect to the length, number, and cross-sectional area of the notches as to provide the desired damping in predetermined relationship with the liquid escape means J which is likewise proportioned to obtain the desired damping effect. When these parts are proportioned in relationship with one another according to the instant invention, improved damping control is obtained for both long and short stroke rebounds and compressions over the range of piston velocities dealt with in normal use of the stock absorber. Furthermore, the rebound chamber F will be filled at all times and free of objectionable cavitation which would undesirably alter the desired resistances on rebound and produce jolts, noise, and frothing of the liquid.

In contrast with the aforesaid conventional type of shock absorbers, the present device has its liquid control parts so proportioned and arranged as to take advantage of what is called a full displacement principle during compression and particularly during the first part of the compression stroke where lag and resistance build-up is particularly troublesome. During operation of the vehicle the bouncing action at the shock absorber tends to emulsify the working liquid by entraining air bubbles in the liquid with the result that there is a tendency to lose shock absorber action, commonly called "fading." In conventional shock absorbers resistance work is not effected on compression until the piston rod displaces sufficient liquid to first take up any voids in the compression and rebound chambers and then force liquid through the conventional base valve control. In my shock absorber the initital movement of the piston on its compression strokes quickly transfers any voids in the compression chamber to the rebound chamber and then immediately meets resistance in displacing liquid from the compression chamber owing to the resistance of the shuttle passage means H as well as that of the liquid escape means J. Thus any lag is taken up with far less initial piston stroke on compression and objectional effects including harshness resulting from lag tendencies are virtually overcome with my invention.

Utilization of the liquid pressure in the compression chamber acting on substantially the full area of the piston in developing resistance on compression is known as the full displacement principle. The efficiency of the full displacement principle increases in proportion to approach to atmospheric pressure on the low pressure side of the piston. This action is in contrast with more conventional arrangements wherein liquid pressures in the rebound chamber are equalized with liquid pressures in the compression chamber during compression strokes, it being apparent that in such types of shock absorbers the effective area of the piston in developing shock absorber resistance is only that area equal to the cross-sectional area of the piston rod, the pressure on the remaining piston area being balanced out. The capacity of the liquid escape means J bears a cooperating relationship to that of the shuttle passage means H in obtaining this full displacement principle and in determining the improved functioning characteristics of my shock absorber.

In the present shock absorber this relationship is such that progressively smooth resistance is built up on compression and rebound strokes while maintaining the rebound chamber F filled at all times so as to avoid cavitation. Inasmuch as the effects of fade are more noticeable in front shock absorbers than in rear shock absorbers and since the front shock absorbers are conventionally called on to perform more work per inch of stroke than the rear shock absorbers and also because of other factors including desirability to provide rebound resistance in the front shock absorbers in an amount as high as practicable in closely approaching the amount of compression resistance provided by the front shock absorbers, the present shock absorber of Figures 1–5 is illustrative of a front shock absorber and represents approximately the optimum efficiency in developing both rebound and compression resistances.

Such optimum characteristics contain as one desirable factor the predetermined relationship between the total area of the shuttle passage means H and that of the liquid escape means J as related to the volumes of liquid displaced on rebound and compression. Such relationship for the same given stroke on compression and rebound may be expressed in the following terms for the illustrated arrangement of shock absorber parts:

$A^1$ is the total area of the shuttle passage means H effective during rebound;

$A^2$ is the total area of the liquid escape means J;

$A^3$ is the cross-sectional area of the chamber F which is for all practical purposes equal to the cross-sectional area of the piston E less the cross-sectional area of piston rod 28; and $A^4$ is the cross-sectional area of piston rod 28.

Employing such terms, then $$\frac{A^1}{A^2} = \frac{A^3}{A^4}$$

In my shock absorber, this ratio for the given 1" cylinder and ½" rod for optimum results approximates 3 to 1 preferably along with the sizes of the shuttle passage means H and the escape means J relatively proportioned according to my teachings.

In striving to generally preserve this ratio, my resulting shock absorber will provide rebound resistance approximating resistance on compression to the fullest extent which can be realized for a given size shock absorber. Deviations in the relationship of $$\frac{A^1}{A^2}$$

from approximate equality with $$\frac{A^3}{A^4}$$

is such that as $$\frac{A^1}{A^2}$$

increases above equality, losses in rebound resistance will be effected at a greater rate than losses in compression resistance but the shock absorber will still operate with less and less developed resistances for a given size device. Only minor deviation of $$\frac{A^1}{A^2}$$

from approximate equality with $$\frac{A^3}{A^4}$$

in the direction of lessening the value of $$\frac{A^1}{A^2}$$

may be tolerated as deviation in this direction tends toward cavitation primarily in the chamber F along with all resulting evils including noise, harshness, aeration, lag, and general inefficiencies. Along with this desirable relationship is the further relationship, from practical standpoints, that the total area of the shuttle passage means shall be about, and at least not greatly less than, .4% of the cross-sectional area of the chamber F as more particularly hereinafter set forth. These optimum relationships are such as to provide rebound resistances most closely approximating compression resistances, good performance at lower range piston velocities, avoidance of excessive liquid pressures, use of liquids of unusually low viscosity, and leakages, and avoidance of requirements to maintain undesired accuracy in limits of the various orifice sizes.

Because of the longer wheel travel per inch of shock absorber piston movement in the usual vehicle installation for the front shock absorbers as compared with the relatively lesser wheel travel per inch of piston movement for the rear shock absorbers, as set forth in said Lewton et al. application, it is desirable to provide somewhat higher resistance by the front shock absorbers than for the rear shock absorbers. Furthermore, in many types of suspension, static friction, load, wheelbase, and spring rates may, by way of example, be very different at the front and the rear of the vehicle with the result that it is desirable to proportion the damping effect of the front and rear shock absorbers to compensate for such differences. Thus to adapt the illustrated shock absorber to a rear shock absorber type it may be desired to increase the sizes of the passages H and J or to provide increased resistance relief, as by providing weaker springing at valving means V.

It is to be pointed out that during compression the shuttle passage means H through piston E between chambers G and F is responsible for most of the resistance work or damping developed by the present shock absorber, the liquid escape means J being responsible for a lesser amount. In the example chosen for illustrative purposes wherein the areas of the piston E and the rod 28 are in the ratio of 4:1, the shuttle passage means H is responsible for up to as much as approximately 75% of the total compression resistance work because it handles substantially three times as much fluid as passage means J which, of course, must pass the fluid displaced by rod 28 into the reservoir chamber D. By effecting such relatively great amounts of resistance work in the shuttle means H which is confined within cylinder 31, the fluid is much more rapidly heated in the working chambers F and G and the shock absorber reaches its average normal working temperature condition much more rapidly than with conventional shock absorbers. By the instant method of damping there is effected more energy absorption at a given fluid pressure than heretofore, most of the energy absorption being effected through the shuttle passage means which is self-contained within cylinder 31. The escape means J is so proportioned in relation to the shuttle passage means H that the escape flow means J will provide a rate of discharge into reservoir D at any pressure developed in the compression chamber G under varying piston velocities such that at any given piston velocity the escape means J will pass slightly less fluid in proportion to the displacement of the piston rod area alone than all the fluid being handled which is passed from below the piston to above it in proportion to the displacement of the piston area less the rod area, the excess insuring against cavitation in the rebound chamber F.

As will be apparent from Figure 1, the chamber F is closed except for the communication of the open ends of the passages 57 with the notches 23. Any liquid which may work past rod 28 will drain from the collecting chamber containing spring 37 down through passage 39 in member 26 and into reservoir D. Chamber G, except for the check valve 63 which is unseated during rebound, is closed to reservoir D except for the communication afforded through the unrestricted central opening 67 and the notch and half notch 76, 74 in disc 72. On rebound, check valve 63 freely admits fluid from reservoir D to chamber G in quantity replacing that ejected through passage means J on compression. The point is to be here emphasized that the valve means V of Figure 1 is not a blow-off valve but is rather a resistance control or resistance relief valve. That is, this valve means does not relieve fluid pressure in the compression chamber but it does function to relieve resistance which would otherwise develop on compression especially in the range of high piston velocities. The passage means H and J are so proportioned relative to each other and with respect to the liquid displacements defined by the cylinder 31, piston E, and rod 28, that the rebound chamber F will be maintained filled during compression strokes irrespective of any opening of valve means V or seepage of liquid past this valve means.

Consequently, the opening of the valve means V in the slight amounts occurring in operation does not result in passing any more fluid, in practical measurable quantity, from chamber G to chamber F than would take place without the valve means V opening. Chamber F is maintained filled on compression stroke without valve means V opening at all, and obviously additional fluid of a practically incompressible nature cannot be admitted to an already full chamber. However, fluid is diverted from flow through the shuttle passage means H to the increasing area afforded by the valve means V when relatively opened at the higher piston velocities which bring about a reduction in the existing pressure differential across the piston, and it is apparent that at the higher piston velocities a small amount of liquid will flow past valve means V during compression but such flow as may take place due to the movement of valve means V is very small. The displacement of the piston E is so large in proportion to minutely small quantities of liquid necessary to raise the pressure in chamber F during compression strokes, particularly at the higher piston velocities, that, as aforesaid, the additional amount of liquid passed due to movement of valve means V over and above what the notches 23 would pass without movement of the valve means V at a given piston velocity on compression is small but sufficient to alter the pressure differential across the piston. The effect of flexing of the valve means V is to increase the capacity of the shuttle passage means H under conditions of relatively high piston velocity. If desired, the physical characteristics of valve means V may be altered to increase this capacity over that illustrated herein in order to lessen compression resistance.

In the modification of Figures 6 through 10, the shock absorber C', in similar fashion to shock absorber C of the first embodiment, comprises a combination of parts including a dirt shield 138, an outer tubular cylinder 135, tubular working cylinder 131, piston rod 128, piston E' having a piston head 155, spiral baffle member 173, cap member 140, spring biased check valve 163, and a base valve carrier 146. The parts of the shock absorber C' to the extent to which they have been thus far described, are similar in proportion, number, arrangement, and size, to the corresponding parts of the first shown embodiment, and cooperate to produce a liquid-containing rebound chamber F', compression chamber G', reservoir D', central passage 167, and interior chamber 171, three passages 144, and a plurality of passages 157 corded in the piston head 155.

The liquid-containing chambers and passages just named are like the corresponding chambers and passages in the first embodiment as to volume, shape, number, and size, besides functioning in the same capacity. On the other hand, in the modified embodiment shown in Figures 6 through 10, the shock absorber C' has a shuttle passage means H' and escape passage means J' formed respectively in the fixed valve elements of the piston E' and base valve 146; that is to say, formed in the valve seats. Such formation is described particularly as follows.

Figures 6, 7, 8, 9:
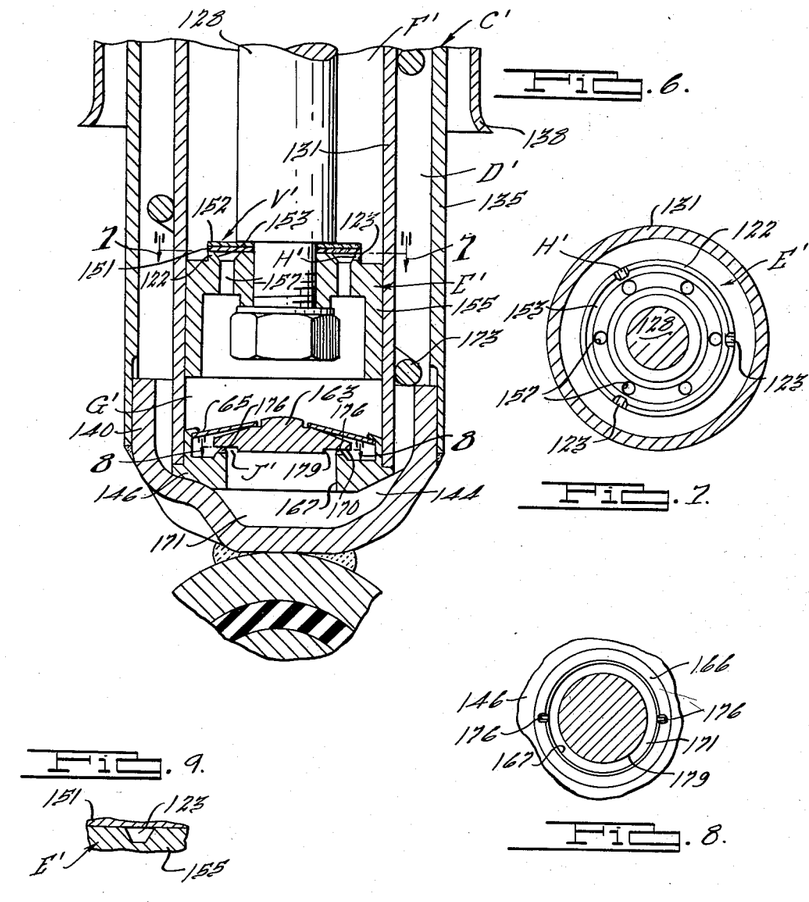
Fig. 6 is a view generally similar to Fig. 1 illustrating a modification of my invention, the Fig. 6 parts being employed in the Fig. 1 shock absorber in place of the corresponding parts in Fig. 1.
Fig. 7 is a sectional plan view taken along line 7—7 of Fig. 6 across the top of the piston.
Fig. 8 is a sectional plan view taken along line 8—8 of Fig. 6 at the top of the base valve seat.
Fig. 9 is an enlarged sectional elevational view through one of the piston notches of Fig. 6.

Piston E' of Figures 6, 7, and 9 has its upper face provided with an upwardly open annular groove 153 surrounded on the outside by a raised land 122. In the top edge of land 122, one or more notches 123 are formed circumferentially spaced one from the other. The notches 123, illustrated as three in number, may be shaped as desired. However, to expedite manufacture it is desired to form the notches by a coining operation so that the notches are preferably V-shaped or of the trapezoidal cross section shown in Figure 9 as this shape is easily formed through a suitable coining operation upon the top of piston head 155 of piston E'. Piston E' has a laminated resistance relief valve means V' comprised by two thin spring steel washer valve disk members 151 and 152. In the illustrated embodiment of Figures 6, 7, and 9 the valve members 151 and 152 are made .010 of an inch thick and clamped between piston head 155 and shouldered rod 128 so as to overlie land 122 and notches 123. Hence the peripheral seating surface of the piston valve means is in effect notched. While the valve members 151 and 152 may, if desired, be subjected to preload when assembled, it is still preferable the same as with the first embodiment, for uniformity under manufacturing conditions to clamp the valve members in position such that member 151 is located flush but unstressed in its relation to land 122, flexing of this valve member being resisted owing to its spring-like character and to assistance from the likewise unpreloaded valve member 152. The three edge notches 123 in land 122 are overlain by valve members 151 and 152 such that the periphery of groove 153 is, as noted, interrupted at intervals.

Figure 10:
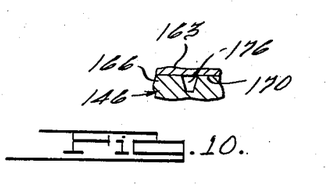
Fig. 10 is an enlarged sectional elevational view through one of the base notches of Fig. 6.

The spring-biased base valve and carrier 146 of Figures 6, 8, and 10 has a seat face provided with an upstanding annular land 166 surrounding the opening of central passage 167. In the top edge of land 166 one or more notches 176 are formed circumferentially spaced one from the other. The notches 176, shown as two in number, may, for reasons noted above, be of the trapezoidal cross section particularly shown in Figure 10 and are easily formed by a suitable coining operation upon the seat face of fixed valve carrier 166 with the result of providing a notched peripheral seat for the base valve. Movable valve element 163 has a boss 179 formed on its under side as a result of a machining operation or otherwise formed to provide an annularly stepped portion 170 which seats flush on annular land 166 on carrier 146. The surface of stepped portion 170 is spring urged into engagement with land 166 and is thus caused to overlie the notches 176 incorporated therein with the result that the seating edges about the upper end of passage 167 are, as above noted, annularly discontinuous. The annular discontinuity of the piston and base valve units owing to the respective seat notches 123 and 176, produces constantly open orifice means H', J' effective each for itself in the respective valve units. The three piston valve notches 123 of Figure 9 already noted to be of trapezoidal cross section, are straight-sided and each defines a passage which, for the illustrated shock absorber of 1-inch piston and ½-inch rod, may satisfactorily be of a top width dimension of .0457", bottom width dimension of .035", and depth from top to bottom of .020". For proper relative proportioning with the dimensions just enumerated and in line with preserving within the optimum assigned limits the ratios of $$\frac{A^1}{A^3} \text{ to } \frac{A^3}{A^4}$$

given in connection with the first embodiment shown, the two trapezoidal base valve notches 176 of Figure 10 are straight-sided and each defines a passage of a top width dimension of .0257", bottom width dimension of .015" and depth from top to bottom of .020". In the illustrated example just given the ratio of areas $$\frac{A^1}{A^2}$$

numerically effected is approximately 3:1, where $A^1$ is the total area of the shuttle passage means H' and $A^2$ is the total area of liquid escape means J' effective during the jounce compression stroke, all notation being similar to that used in the discussion of the first embodiment. Other and various satisfactory notch combinations will be readily suggested in the light of my teachings and within the broader aspects of the invention.

Figure 11:
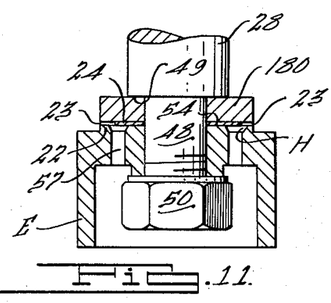
Fig. 11 is a sectional elevational view of a piston assembly of modified construction adapted for use in my shock absorber assemblies in lieu of the piston assembly of Fig. 1 or Fig. 6.

In the modified piston arrangement of Fig. 11, I have illustrated the same notched disk 24 of Fig. 1 associated with the same piston E. However, instead of this disk 24 operating as a valving element and instead of this disk being yieldingly seated by overlying disks 51, 52 as in Fig. 1, the notched disk 24 of Fig. 11 maintains its position seated on land 22 and hence has no function of resistance relief on compression strokes. To this end the disk 24 is held constantly fixed with the piston in any suitable manner as by clamping it in position by a stiff unyielding steel washer disk 180 of appropriate thickness such as ⅛" to insure against appreciable yielding action under liquid pressures developed in chamber G. Notches 23 are preferably as shown and described in connection with the Fig. 1 embodiment. This Fig. 11 piston is adapted to be substituted for the piston in the Fig. 1 assembly or in the Fig. 6 assembly.

Figure 12:
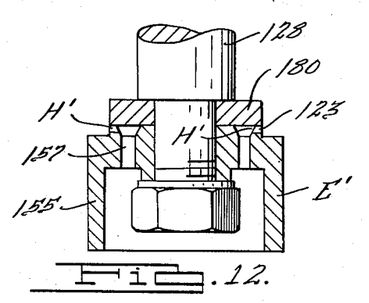
Fig. 12 is a similar view of a further modified piston assembly adapted for use in my shock absorber assemblies in lieu of the piston assembly of Fig. 1 or Fig. 6.

In Fig. 12 I have shown the notched piston E' of Fig. 6 fitted with the rigid disk 180 of Fig. 11. Thus Fig. 12 is very similar to Fig. 11 and functions during compression without compression relief valving. The rebound strokes of all of the illustrated embodiments are, generally speaking, equivalent to each other in that the liquid escape from chamber F is limited to the shuttle passage means of notch form.

From what has been said herein for each of the illustrative embodiments of the principles of my invention it will be apparent that the shuttle passage means H or H' has a predetermined capacity to conduct or flow liquid under pressure therethrough. This liquid flow capacity will, of course, vary as the liquid pressure differential between chambers F and G varies and is determined by the size, shape, and number of the passages which constitute the shuttle passage means as aforesaid. When this has been determined, according to the teachings of my invention, apart from considerations of compression relief valving where employed, the liquid flow capacity of the shuttle passage means will thereby be fixed or constant for any given liquid pressure differential and will thereby determine the liquid flow resisting characteristic of the shuttle passage means in effecting resistance to movement of the shock absorber piston over its range of velocities incident to normal use of the shock absorber in damping relative movements between the vehicle ground wheel and sprung parts such as the body. Likewise the liquid escape passage means J or J' has a predetermined capacity to conduct or flow liquid therethrough when subjected to a liquid pressure differential between chamber G or G' and the reservoir D or D' and this liquid flow capacity will likewise vary as the pressure differential varies. The liquid flow capacity of the liquid escape means is likewise determined as aforesaid by the size, shape, and number of the passages which constitute the escape passage means and when this has been determined, according to the teachings of my invention, the liquid flow capacity of the escape passage means will thereby be fixed or constant for any given liquid pressure differential and will thereby determine the liquid flow characteristic of the escape passage means in effecting resistance to movement of the shock absorber piston in the direction of its reciprocatory movement toward the check valve means 63 and over its range of velocities incident to normal use of the shock absorber.

Because of the inherent characteristic of the shuttle passage means to restrict flow of liquid between chambers F and G for example, the shuttle passage means H may be said to restrict free flow or escape of liquid therethrough between chambers F and G when piston E reciprocates. This is in sharp contrast with the aforementioned conventional shock absorbers having a pressure relief or check valve associated with one or more conventional liquid conducting passages which are of such large liquid flow capacity as to permit or accommodate free flow of liquid therethrough so that when the valve is open the liquid in the conventional rebound chamber is deliberately permitted to substantially equalize its pressure with the pressure of the liquid in the conventional compression chamber when the piston stroke is toward the conventional check valve controllingly associated with the liquid reservoir.

In Figs. 1, 6, 11, and 12 the notch form of the shuttle passage means H or H' provides substantial improvements over the arrangement in said Lewton et al. application. My notch arrangement lends itself to improve ease of manufacture, lower cost, and improved performance. It is customary as a matter of practical expediency to permit manufacturing tolerances in the dimensions of the various parts of the shock absorber including the orifice portions, such permissible tolerances necessarily entering into the proportionate and dimensional relationships expressed as desirable herein so as to render these values only approximately accurate. However, with my invention the desired relationships may be more nearly obtained as it is a simple matter to obtain a good degree of accuracy in coining or stamping the notches of the various liquid flow restricting passages. The coined notches of Figs. 6 and 12 provide further simplification and cost reduction in that these notches at 123 and 176 are formed in parts E, E', 46, and 146 which are already present in shock absorbers thus minimizing the number of parts required.

An additional feature of my invention over said Lewton et al. application resides in more consistent and better performance of shock absorbers especially when turned out in regular quantity production, including quieter operation and more uniform filling of the working liquid chambers and operation of the piston without lag. In my arrangements incorporating notch orifices it will be noted that during compression strokes the liquid jets or streams are directed by the notch shuttle passage means H or H' substantially radially of the piston and cylinder axis toward the inner walls of the cylinder 31 or 131 rather than parallel to such axis. In addition, during compression, the liquid streams are directed through the escape means J or J' inwardly of passage 67 toward the axis of the cylinder and passage and where multiple notches are employed, as illustrated, these streams impinge on each other within the passage 67 and reservoir chamber 71 or 171. Such arrangements have been found to substantially reduce noise effects incident to liquid flow during operation of the shock absorber on compression strokes. Furthermore on rebound it will be noted that the fluid streams from the notch shuttle passage means H or H' are directed inwardly toward the axis of the piston rod portion 48 and not parallel thereto toward the base check valve 63 or 163. This allows the check valve to have an improved freedom of lift movement in response to suction in chamber G or G' unhampered by the liquid jets in passing liquid from chamber F or F' to chamber G or G'. This action permits the effective use of a light check valve spring 65 and insures more positive refill of chamber G and G' during rebound strokes as these chambers start to fill immediately during the rebound strokes and are not required to "catch up" on the refill as such strokes continue. This in turn insures against lag when the piston next starts its compression stroke after rebound, and reduces or eliminates tendency to harshness, bumps, and noises as the piston reciprocates.

Where compression relief valving is employed, as in my Figs. 1 and 6 embodiments, I prefer to employ multiple spring steel disks, as at 51, 52, or 151, 152, rather than a single disk although any number of spring valve disks may be employed as long as the total spring action is such that the desired valving relief is obtained. Member 24 may be thicker than noted herein in which event notches 23 will be proportioned to preserve the total area as noted herein for the same size shock absorber and the strength of the coacting spring disk or disks made proportionately less as the thicker disk 24 will then provide substantial spring resistance action. It is noted that stresses incident to springing of the compression relief disks is desirably minimized in any one disk by using a plurality of spring disks. The notched disk 24 of Fig. 1 is relatively ineffective as far as relief valving action is concerned as, in the illustrated embodiment, this disk is only .0045 of an inch thick whereas disks 51, 52, 151, 152 are .010 of an inch thick. The stiffness of such disks varies, generally speaking, as the cube of the thickness of the disk which largely nullifies the effect of disk 24 functioning as a relief control in comparison with this function of the disks 51, 52, or 151, 152 although disk 24 does of course have some degree of functioning for relief control. If desired a single disk of appropriate greater thickness for the same general performance may be substituted for the two disks 51, 52, or 151, 152 or more than two disks of thinner dimension may be employed.

My shuttle passage means H or H' and the escape means J or J' are of substantial length in contrast with sharp edge orifices which in general provide flow resistance proportionate to the square of liquid velocity. In general sharp edge or very thin disk orifices are not as desirable as my notch arrangements, for example, as they tend to build up resistance too fast. With my arrangements I provide adequate resistance control at low piston velocities without undesired overcontrol or excessive resistances at high piston velocities and I consider the arrangements of Figs. 11 and 12 without compression resistance relief, to be practical devices as noted hereinbefore. Even when compression relief is provided for, as at V or V' for example, the notch orifices H, H' and J, J' are preferably relatively proportioned as though no compression relief was present because such relief is ineffective at low piston velocities or shock absorber activity over the low range and, of course, fully and preferably exclusively effective on rebound for all piston velocities. Therefore, whether or not compression resistance relief is provided, the various orifices for optimum results according to my invention bear certain relationships to each other and to the size of the shock absorber in terms of the diameter of the piston or working cylinder and the piston rod. It is also to be noted that the compression and rebound chambers may be "reversed" in their relation to the vehicle wheel and body as set forth more fully in said Lewton et al. application and in certain of my claims such arrangements may be conveniently encompassed by designating chamber G as a "first" chamber, chamber F as a "second" chamber, and the piston E having a movement in "one direction" which in Fig. 1 is for rebound, and a movement in its "other direction" as for compression in Fig. 1.

Before noting some of the resistance performances of my shock absorber, I will briefly point out certain of the desirable relationships in following my teachings for most efficient results.

As aforesaid, one of these relationships is that $$\frac{A^1}{A^2}$$

shall be approximately equal to $$\frac{A^3}{A^4}$$

Inasmuch as $$\frac{A^3}{A^4}$$

for the illustrated 1" shock absorber having 1" cylinder diameter and ½"-piston rod diameter is 3 to 1, $$\frac{A^1}{A^2}$$

for each of my illustrated embodiments is likewise approximately 3 to 1 for this shock absorber. A small variance in the value of $$\frac{A^1}{A^2}$$

from equality with $$\frac{A^3}{A^4}$$

in the direction of the low side may be tolerated for optimum results and as aforesaid a larger variance is often intentionally provided on the high side where less than maximum efficiency is desired. Everything considered the desired relationship may be expressed with the desired degree of accuracy such that $$\frac{A^1}{A^2}$$

shall be in excess of approximately $$\frac{A^3}{A^4}$$

which, of course, for the 1" shock absorber defines or encompasses a ratio of $$\frac{A^1}{A^2}$$

slightly less than 3 to 1 and substantially more than 3 to 1 where it is desired to provide less than maximum resistance and optimum results and efficiency.

As an example of the foregoing, my Fig. 1 shock absorber with the disks 24 and 72 notched according to the dimensions hereinbefore noted provides a total area of the shuttle passage means H of approximately .00225 square inch and a total area of the escape passage means J of approximately .0008437 square inch such that $$\frac{A^1}{A^2}$$

is approximately 2.7 to 1 or substantially 3 to 1 considering allowable tolerances, unavoidable leakages past the piston, and other factors noted herein. In my Fig. 6 embodiment, the total area of H' is approximately .002421 square inch and J' approximately .000814 so that $$\frac{A^1}{A^2}$$

is approximately 2.98 to 1.

Another way of expressing the desired relationship of the total area of the shuttle passage means in terms of shock absorbers of varying sizes, it being noted that the shuttle passage means is effective for a major portion of resistance developed on compression and all of the resistance on rebound, is that the total area of the shuttle passage means for optimum results shall be in excess of approximately .4% of the difference in cross-sectional area of the working cylinder and piston rod. In the specific examples noted for H of Fig. 1 and H' of Fig. 6 the computed values of this character are respectively .38% for Fig. 1 and .404% for Fig. 6.

In practice I have found that generally desirable results may be obtained, using the principles of my invention, by providing shuttle passage means H having values as low as .27% of the rebound area. However, liquid pressures developed under such low values tend to be excessive and this requires special consideration of strength of materials of the component parts of the shock absorber and its mountings, selection of special liquids to guard against breaking down of the working liquid, and more careful consideration of manufacturing tolerances. Usually it is found to be more desirable, where additional resistance is desired over that provided by my illustrated shock absorbers, to increase the size of this unit rather than to carry the above noted .4% value to its extreme possibilities in the direction of reducing this value.

I will now outline the general performance characteristics of my shock absorber on compression and rebound, it being remembered that I have illustrated and described a shock absorber of high efficiency in which it is a simple matter to obtain lesser efficiencies than those provided by my shock absorber. In general, the performance data is that which is applicable to each of my illustrated embodiments and closely parallels performance characteristics of the front shock absorber of said Lewton et al. application. Piston velocities noted herein, unless otherwise specified, are those occurring at the point of maximum velocity at approximately mid-stroke on compression and rebound.

It is, of course, a difficult matter to speak with definiteness on shock absorber performance under conditions of "boulevard" ride, "small" bumps, "medium and big" bumps encountered by the vehicle. A small or medium bump in the roadway can become a "big" bump at higher vehicle speeds and a "Big" bump at high speed can be a "small" bump at low vehicle speed. I have resolved this difficulty by translating such variables into terms of piston velocities since this is a definite yardstick of operating conditions and determines the functioning of the shock absorber under all conditions. With this in mind piston strokes which produce maximum piston velocities up to say the general neighborhood of around .6 ft. per second may be considered as low range performance, around 1.3 ft. per second average or medium range performance, and around 2.6 ft. per second high range or rough road performance, it being understood that velocities considerably in excess of 2.6 ft. per second are often experienced on compression and may go even as high as around 6 ft. per second. However, I have found that a shock absorber which performs satisfactorily at the piston velocities noted will usually provide good general performance on the road and therefore these fingers will be fairly representative for purposes herein of referring to low, medium, and high range shock absorber performance.

I desire to further point out that it is extremely difficult to accurately measure liquid pressures in chambers F and G at the point of maximum piston velocity over the ranges of performance. However, I have obtained data which is believed to be fairly accurate and at least representative of a pattern of performance unique to my shock absorber although closely related to said Lewton et al. application.

Figure 13:
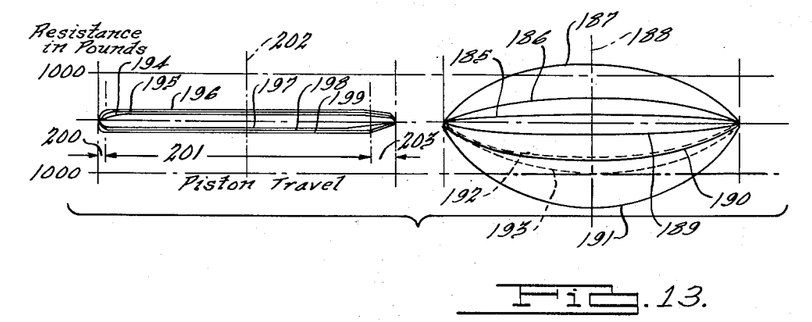
Fig. 13 is a diagrammatic graphical illustration of typical performance characteristics of my shock absorber related to performance of the aforesaid conventional shock absorbers.

Referring to Fig. 13, I have somewhat diagrammatically illustrated certain typical performances of my shock absorber and my novel damping principles in contrast with typical conventional performance characteristics referred to hereinbefore.

In Fig. 13, I have illustrated typical rebound resistance curves 185, 186, and 187 developed by machine operation of my shock absorber, resistance being plotted against piston travel, the machine being of the well known type employed in shock absorber tests in which the piston is moved relative to its cylinder with approximately simple harmonic motion derived by connecting a rotating crank with the shock absorber piston rod. These curves 185, 186, and 187 illustrate forced resistances developed by my shock absorber during operation of the test machine for a 3" typical stroke for 55, 100, and 200 R. P. M. or cycles per minute respectively and substantially duplicate actual performance of the shock absorber on the vehicle for variations in conditions between mild and severe compressions and rebounds. In each instance, the resistance builds up smoothly under fluid damping to a maximum at approximately piston mid-stroke regardless of maximum piston velocities indicated at 188 and then falls off smoothly under fluid damping to zero as the piston reaches the end of its rebound stroke. It will be noted that the resistance build-up portion of each curve up to the piston mid-stroke at 188 is similar to the remaining half of the curve when the resistance diminishes from the piston mid-stroke to the end of the stroke. The rebound curves 185, 186, and 188 are also typical of performance of my shock absorber with or without valve means V or V' as this valve means does not affect rebound performance.

The compression resistance curves companion to and completing the cycle of rebound curves 185, 186, and 187 are shown in Fig. 13 at 189, 190, and 191 for my shock absorber of my Figs. 11 and 12 types without valving means V or V' while the companion curves for my Figs. 1 and 6 shock absorbers with valving means V or V' are shown at 189, 192, and 193. It will be observed that there is no appreciable difference in compression resistance at 55 cycles per minute with either the Figs. 11 and 12 or the Figs. 1 and 6 arrangements and, in fact, very little difference at 100 cycles per minute but as the cycles per minute increase, with proportionate increase in piston velocity, the compression resistance falls off at an accelerated rate relative to increases in compression resistance for the Figs. 1 and 6 arrangements. It will be noted that with my Figs. 1 and 6 arrangements the compression curves 189, 192, and 193 are substantially similar to the rebound curves 185, 186, 187 and is made possible by the valve means V or V' which so controls compression resistances, especially in the range of maximum piston velocity at 188 where peak resistances are developed, as to limit these resistances in comparison with their values with the Figs. 11 and 12 arrangements according to curves 189, 190, and 191.

I have obtained good results with my Figs. 11 and 12 arrangements but I have found that resistances developed on compression, especially for extreme wheel jounce movements produce resistances which cause failure in mounting studs which are conventionally employed. Although these studs and parts mounting them can, of course, be made of such size and strength to prevent failure, I nevertheless prefer in most types of passenger car installations to reduce these peak resistances and my Figs. 1 and 6 arrangements accomplish this control. Before describing the functions of valve means V or V' in further detail I will, by way of contrast, refer to more conventional "blow-off" valves of conventional shock absorbers.

In Fig. 13 I have illustrated typical performance rebound curves 194, 195, 196 and compression curves 197, 198, 199 for a conventional shock absorber referred to herein as being of the "blow-off" type in which fluid pressure in both the jounce and rebound chambers builds up rapidly, then abruptly flattens off with only slight build-up for nearly all of the piston stroke, and then abruptly falls off. These curves illustrate the same conditions of operation and for the same size shock absorber as for my Fig. 13 characteristics, the scale being the same. Thus the Fig. 13 conventional characteristic curves could be superimposed for comparative marked contrast but for clarity they are shown adjacent each other where comparison may be conveniently made.

In Fig. 13 for each of the widely varying piston velocities as determined by the test machine crank operation at 55, 100, and 200 R. P. M. corresponding to rebound resistance curves 194, 195, and 196, respectively, and compression resistance curves 197, 198, and 199, respectively, it will be apparent that the curves are very close to each other and that peak resistances developed are nearly the same in spite of the wide variation in piston velocity. Thus in each instance resistance rapidly builds up over the very short initial portion of the piston stroke 200 at which time the conventional blow-off relief valve opens to prevent further substantial pressure rise. This results in an abrupt objectional change in the rate of resistance increase, the resistance at blow-off being generally maintained through nearly the entire piston stroke, as indicated by the stroke portion 201. The slight resistance rise to the mid-point 202 during the stroke portion 201 is largely the result of slight added resistance to fluid flow through the blow-off valve. Then, as the piston velocity approaches rest at the end of its stroke with resulting diminution of fluid pressure on the piston the blow-off valve closes abruptly and the resistance rapidly falls off to zero during the small portion of the terminal piston stroke as at 203. The compression characteristics 197, 198, and 199 for this conventional type of shock absorber are substantially the same as the rebound curves 194, 195, and 196.

Returning now to the valve means V or V' of Figs. 1 and 6, this valve is not a blow-off valve and it is not a pressure relief valve such as have heretofore been common in prior shock absorbers. The performance curves 194 to 199 of Fig. 13 illustrate the functioning of conventional shock absorbers on both compression and rebound wherein pressure in both the compression and the rebound chambers is prevented from rising substantially above a predetermined amount virtually regardless of increase in piston velocity, the conventional valving functioning to relieve pressures in each chamber in excess of such amount. In contrast with such conventional performance, my valve means does not appreciably relieve any fluid pressure in the compression chamber although it does function to relieve resistance which would otherwise develop on compression especially in the range of relatively high piston velocities.

My flat spring steel disks 51, 52, or 151, 152 constituting valving means V or V' functions to progressively increase the pressure in chamber F, on compression, such pressure increase in Figs. 1 and 6 in comparison with my Fig. 11 or 12 arrangement, being negligible for relatively low piston velocities but building up at an accelerated rate as piston velocities increase over the relatively high range of piston velocities where reduction of peak resistance forces is desirable.

With each of the embodiments of my shock absorbers substantially the full piston area is effective to develop compression resistance up to around 50 or 55 cycles per minute of shock absorber operation. In other words, in this range of operation the fluid pressure in the compression chamber, on compression, acts against the full piston area in developing compression resistance. As the cycles increase with corresponding increase in maximum piston velocity, valve means V in Fig. 1, which is typical of the operation of valve means V' of Fig. 6, functions to progressively allow pressure to build up in the rebound chamber F during compression strokes, with very little rate of build up at first but rapidly accelerating in rate of build up as piston velocities approach 200 cycles of operation and above. When pressure in the rebound chamber increases above atmospheric, during compression strokes, only the difference in pressure in chambers G and F is effective on the area of the piston less that of the piston rod, it being apparent that the pressure in chamber G is furthermore always effective in developing compression resistance by acting on an area of the piston equal to that of the rod 28, so that by building up the pressure in the rebound chamber the total resistance on compression can be controlled and diminished by valve means V. Therefore, while the valve means V does not at any time equalize the pressure in chambers G and F it does trend in this direction especially when the compression strokes become extreme.

During compression strokes of the shock absorber the resistance developed is determined by the differential of pressures in chambers F and G. Thus the compression resistance is the pressure of the liquid in the compression chamber G times the cross-sectional area of the piston E less the pressure of the liquid in the rebound chamber times that portion of the piston area that bounds this chamber, i. e., the cross-sectional area of the piston less that of the rod 28. When the pressure of the liquid in the rebound chamber is at atmospheric then the resistance is the product of the compression chamber pressure times the piston area. As the pressure of the liquid in the rebound chamber increases it will be apparent that the resistance, based on the aforesaid pressure differential, will be less than the product of the compression chamber pressure times the piston area but at any time in the compression stroke there will be some portion or per cent of the full piston area which, when multiplied by the compression chamber pressure, will equal the resistance developed at such time and for convenience of reference such portion or per cent is designated as the "effective" piston area. For example, when the pressure of the liquid in the rebound chamber is at atmospheric then the full piston area is effectively acted on by the pressure of the liquid in the compression chamber in producing compression resistance. If the liquid pressures were substantially equal in chambers F and G as is customary in conventional shock absorbers acting on compression, then the effective piston area would be that portion which is equal to the cross-sectional area of rod 28 and the compression resistance would be equal to the product of this area times the pressure of the liquid in the compression chamber. Thus, for any given liquid pressure in the compression chamber, the effective piston area for compression resistance will decrease from the full piston area as pressure of the liquid in the rebound chamber increases. In my shock absorber I have provided an improved construction for liquid flow control on compression strokes whereby as piston velocities increase toward values which would result in undesirably high compression resistances, such resistances are kept within desirable limits by utilizing the compression chamber pressures to increase the rebound chamber pressures thus diminishing the portions of the piston area which are effectively acted on by the pressure of the liquid in the compression chamber, the rate of such increase being accelerated as the piston velocities approach their maximum values under conditions encountered by whatever use to which the shock absorber is put. Therefore, while references herein to the effective piston area relationship with compression chamber pressure offers a convenient manner of expressing compression resistance characteristics of my shock absorber, this relationship is actually but a computed equivalent, for convenience of reference, of the more involved differential pressure expressed above in terms of liquid pressures in the compression chamber G and in the rebound chamber F along with their respectively related cross-sectional areas of the piston and the piston minus the rod.

For a typical 3" stroke of my shock absorber on the test machine, operation at 50 cycles per minute provides a maximum piston velocity of .65 foot per second, 55 cycles providing a velocity of .715, such operations corresponding generally to ordinary conditions of vehicle travel over fairly good roads and arbitrarily designated as the low range of operation of the shock absorber. Operation on the machine in the medium range at 100 cycles per minute produces 1.315 maximum piston velocity and corresponds approximately to vehicle travel over average moderately rough roads and at the high range of 200 cycles, producing 2.63 maximum piston velocity, there is fair equivalency to what may be termed very rough roads. Under extreme conditions a piston velocity as high as around 6 feet per second has been experienced. These equivalencies are only general as opinions vary as to classification of degrees of road roughness but will nevertheless serve to generally correlate the functional data given herein for my shock absorber with vehicle ride characteristics and to demonstrate the value of machine test data.

Figure 14:
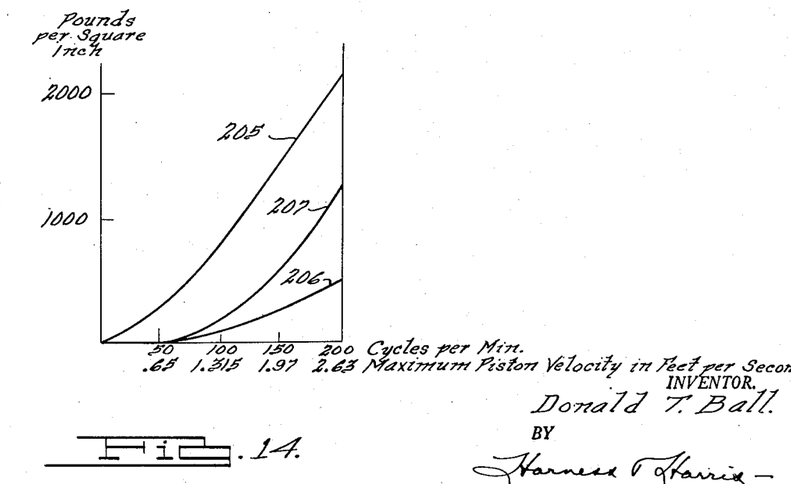
Fig. 14 is a diagrammatic graphical illustration of performance characteristics of my shock absorber both with and without the resistance relief valving, maximum fluid pressures in the compression and rebound chambers being plotted against cycles per minute of shock absorber operation or maximum piston velocity at such cycles.

The function of my valve means V or V' as a resistance relief valve by controlling the amount of piston area effective in developing compression resistance as distinct from conventional pressure relief valving is an important characteristic of the Figs. 1 and 6 shock absorbers. In Fig. 14, for example, I have shown approximate performance of the Figs. 1 and 6 as well as the Figs. 11 and 12 shock absorbers operating at a 3" stroke, maximum fluid pressure in pounds per square inch being plotted against cycles per minute and the equivalent maximum piston velocity in feet per second. In Fig. 14 curve 205 shows generally the maximum pressure in the compression chamber G both without the valve means as for Figs. 11, 12, and with the valve means V, or V' as for Figs. 1 and 6, the valve means having no appreciable effect as aforesaid on fluid pressures developed in chamber G. It is apparent that pressures developed rise at an increasing rate, especially after around 100 cycles per minute and in fact pressures in chamber G have been measured as high as 5000 p. s. i. for extreme piston velocities.

With the Fig. 11 or 12 shock absorber the maximum pressure in the rebound chamber F during compression strokes increases above atmospheric pressure moderately after around 50 or 55 cycles, as noted from curve 206, becoming somewhat more pronounced in the rate of increase as the piston maximum velocity increases. However, while substantially the entire piston area is effectively acted on by the fluid pressure in chamber G during compression strokes up to around 50 to 55 cycles per minute, much of the full displacement principle is effective even at 200 cycles where under the conditions noted substantially more of the piston area is similarly effectively acted on than the area equal to the piston rod. Throughout practically all of the normal range of activity on the vehicle, all illustrated embodiments of my shock absorber utilize an effective portion of the piston acted on by the fluid pressure in chamber G during compression strokes which effective area is more nearly equal to the full cross-sectional piston area than to the cross-sectional area of the piston rod. This is apparent from Fig. 14, curve 207 indicating the effect of the compression relief valve means in reducing the effective piston area on compression by building up the fluid pressure in the rebound chamber at a small rate of increase over the Figs. 11 and 12 performance between around 50 to 55 cycles and 100 cycles and at an accelerated rate of increase thereafter. In each instance, either with the Figs. 1 and 6 or Figs. 11 and 12 arrangements, the whole effect of the full displacement principle is available throughout the entire compression stroke of the shock absorber up to around 50 or 55 cycles per minute, this being of substantial advantage to avoid fading which is a noticeable characteristic of conventional shock absorbers. Furthermore, the whole effect of full displacement principle is effective during the initial compression stroke over the whole range of performance of the shock absorber, the values indicated by way of example at 206 and 207 in Fig. 14 being maximum pressures attained in the rebound chamber at the instant of maximum piston velocity.

I desire to again point out that the values shown in Fig. 14 are approximate owing to extreme difficulty in obtaining accurate data for the illustrated pressures under conditions of shock absorber operation. However, they illustrate approximate conditions and general pressure trends which I have measured.

Figure 15:
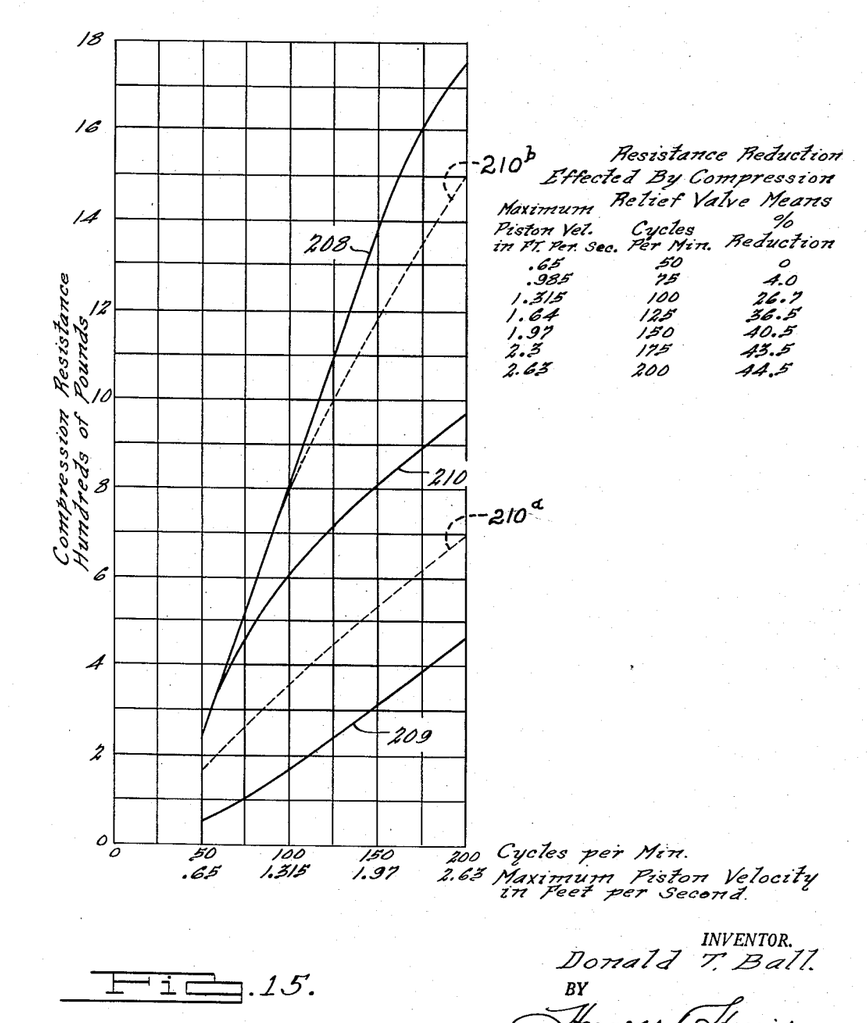
Fig. 15 is a diagrammatic graphical illustration of compression resistance performance of my shock absorber.

Referring to Fig. 15, I have illustrated the characteristics of my shock absorber as hereinbefore described. For convenience of reference the shock absorber which is equipped with my resistance relief valve means V or V' of Fig. 1 or 6 is referred to as having relief or relief valve means and the other embodiments in Figs. 11 and 12 as not having this relief or relief valve means. In Fig. 15 I have shown compression resistance in hundreds of pounds plotted against cycles in R. P. M. of 3" stroke machine operation and the equivalent maximum piston velocity incident to such operation as in Fig. 14. Included also is a table showing approximately the per cent reduction in total compression resistance effected by the provision of my relief valve means at various piston velocities.

Performance curve 208 indicates the compression resistance of my shock absorber without relief valve means as for example in Fig. 11 and Fig. 12 or in the other figures if the effect of the relief valve means is not taken into consideration. At 209 I have shown the resistance developed by my shock absorber, in all illustrated forms, by the flow restricting effect of the liquid escape means J or J' alone. In other words the curve 209 represents compression resistance by the action of piston rod displacement alone just as though the piston was removed. Curve 210 represents the compression resistance developed by my shock absorber of the type having my relief valve means as in Fig. 1 or 6.

It is to be noted that curves 210 and 208 are merged together for piston velocities below approximately .8 foot per second or just about at the low range upper limit of around .65 to .73 foot per second which corresponds to the maximum piston velocity on the test machine operating at 50 to 55 R. P. M. Therefore whether or not the relief valve means is incorporated in the shock absorber the low range compression performance characteristic is substantially identical showing that the shuttle passage means is effective to the same extent in the low range. From the table in Fig. 15 it will be noted that around the medium or intermediate range which has been arbitrarily selected at around 100 R. P. M. or 1.315 feet per second piston velocity the relief valve means, when present, has now effected a marked separation between curves 208 and 210, the table indicating that the compression relief valve means has now effected a 26.7% reduction in compression resistance as shown by curve 208 which is developed by using only the shuttle passage means for controlling liquid flow from chamber G to chamber F.

When my shock absorber is operated without my compression relief valve means as in Fig. 11 or 12, as represented by curve 209, only about 23% of the total shock absorber resistance is effected by the liquid flow through the escape means J or J', the balance being effected by liquid flow through the shuttle passage means on compression. In other words, my shuttle passage means in all of my illustrated embodiments for the 1" shock absorber having the ½" diameter piston rod is designed to be responsible for approximately 75% of the total resistance on compression and all of such resistance on rebound; the effect of the relief valve means being to reduce the per cent of total compression resistance attributable to the shuttle passage means while increasing the per cent of the total compression resistance attributable to the escape means and at the same time reducing the total resistance developed above the low range.

When the relief valve means comes into operation initially, it is still relatively ineffective at the lower limit of the intermediate range above around .73 foot per second. Even at .985 foot per second piston velocity the table shows that the valve means has effected only 4% reduction in the compression resistance. The reduction in compression resistance effected by the valve means then becomes much more pronounced, being 26.7% at the assumed intermediate range velocity of 1.315 feet per second. The upper limit of the high range, assumed to be about 1.97 feet per second piston velocity, is attended by about 40.5% in resistance reduction by the valve means; this reduction increasing through the high range.

By substituting weaker valve disks for those shown at 51, 52 or 151, 152 or by increasing the total area of the shuttle passage means H or H' and the liquid escape means J or J' or by effecting all of these changes, the resistance developed by the shock absorber may be lessened to any desired extent and, of course, the efficiency will also be correspondingly reduced.

If desired any of my disclosed shuttle passage means may, within the broader aspects of my invention, be employed with either form of my escape means J or J' or any of my shuttle passage means may be used with other forms of escape means such as that disclosed in said Lewton et al. application or more conventional base valve constructions. Likewise my escape means J or J' may be used to advantage with other forms of shuttle passage means such as disclosed in said Lewton et al. application or with more conventional types of liquid controls between the rebound and compression chambers.

In each of the illustrated embodiments of my invention there is provided an unrestricted liquid passageway means constituted by the piston passages 57 and annular groove 53 for opening the chamber G for free liquid flow to the engaged seat portions provided respectively at the piston land 22 and the adjacent disk of the disk means which overlies the liquid passageway means to close the end thereof at the upper face of the piston, one of these seat portions being notched to provide the shuttle passage means H or H'. The liquid passage means at the base of the shock absorber is constituted by the relatively stationarily mounted structure 46 having the unrestricted passage 67 and a seat portion at 66 engageable with the companion seat portion of the check valve structure 63, one of these seat portions being notched at J or J' for constant restricted liquid communication between chamber G and the reservoir. If desired, the notches 74, 76 may be formed directly in valve 63 but it is usually more convenient to form them in a disk 72 which is then attached to valve 63 and in effect thus becomes a fixed portion of this valve. Furthermore, the groove 53 could be omitted and the adjacent disk spoked to cover the piston holes 57 although the illustrated form of annularly seating the disk means with the upper piston face is preferred. In either instance, where relief valving means is employed as in Figs. 1 and 6, liquid from chamber G will by-pass the notch shuttle passage means H or H' between the seat portions of the piston and disk means in response to predetermined pressure of the liquid in chamber G.

It will be noted that in each of my illustrated embodiments in Figs. 1, 6, 11, and 12, the shuttle passage means H or H' has a predetermined total area restrictively presented not only to the liquid in chamber F or F' throughout the length of piston strokes toward the closure 26 but also to the liquid in chamber G or G' during piston strokes toward check valve 63 or 163, such total area being solely that which restricts liquid flow during the latter strokes in Figs. 11 and 12 where liquid is not permitted to by-pass the shuttle passage means H or H'. In Figs. 1 and 6 incorporating the compression relief valve means V or V' the shuttle passage means is effectively increased in its liquid flow capacity at and above piston velocities as noted hereinbefore. In all embodiments the pressure of the liquid in the chamber F is, generally speaking, approximately at atmospheric pressure for low range piston velocities, both with and without relief valving, less than around .5 foot per second, such pressure in all instances increasing proportionately to increases in maximum velocity of the piston during compression strokes and more rapidly increasing with the Figs. 1 and 6 valving V or V'.

In the foregoing description of my compression relief valving means V and V' I have set forth for illustrative purposes a typical example of the principles involved in the control of compression resistance wherein this valve means is ineffective to relieve compression below around .6 foot per second of piston velocity on compression. This arrangement is somewhat of a compromise in that it is well adapted for use with a wide variety of automobiles in the so-called light, medium, and heavy car classifications. It is a simple matter to so alter the functioning of the valving means, as by varying the number of disks used or by substituting disks of stiffness varying from that specifically noted herein, that the amount of compression relief may be varied so that, for example, less relief will be provided for heavy cars and more relief for light cars. As an example of a variation affording less relief, my disks 51 and 52 of Fig. 1 or disks 151 and 152 of Fig. 6 may be made of thinner spring steel, the remaining parts being as shown and described. By using these two disks of a thickness of .006 of an inch for example then the compression resistance will be substantially lessened over the whole range of compression activity. Also, instead of compression relief starting to become effective at piston velocities around .6 foot per second, these thinner disks will start to become effective at substantially lesser piston velocities and by using still thinner disks it is possible to initiate compression relief at all piston velocities if such be desired although at extreme conditions of thinning the disks in relation to relatively high rebound pressures I have noticed some tendency for rebound pressures to dish the disks in the annular groove 53 and give rise to resistance losses on rebound and compression as an incident to disk deformations. A typical performance characteristic of my shock absorber employing the aforesaid .006 relief valving disks is indicated at 210$^a$ in Fig. 15. Of course when such valving is employed then the table of per cent resistance reductions is no longer correct as these values will be different and can be readily computed from curve 208. Generally speaking these percentages will be substantially greater and will be initially effective at a substantially lower piston velocity. Conversely by making these relief disks thicker, for example about .012 of an inch, compression relief in my illustrated shock absorber becomes effective at around 1.3 feet per second piston velocity and compression resistance values are substantially greater than as indicated for curve 210 in Fig. 15. Compression resistances for such .012 disks are of the order of the curve 210$^b$ in Fig. 15. Compression performance characteristics between the illustrated curves 210, 210$^a$ and 210$^b$ may obviously be readily obtained as desired by appropriate selection in the thickness of the relief disks employed or in the number of such disks. It will be apparent that with the .006 compression relief disks the corresponding compression curves of Fig. 13 will peak at substantially lesser maximum values than as indicated for the curves 189, 192, and 193 with more pronounced deviation as the maximum piston velocities increase. Correspondingly with the .012 disks the compression curves will peak at substantially greater maximum values than as indicated for the curves 189, 192, and 193 likewise with more pronounced deviation as the maximum piston velocities increase.

I claim:

In a direct acting hydraulic shock absorber of the type having a working cylinder closed at one end through which a piston rod extends for operable connection with a working piston reciprocably mounted in said cylinder to provide a rebound chamber adjacent said closed cylinder end and a compression chamber adjacent the other cylinder end, a tubular member surrounding said cylinder to provide a liquid reservoir, and check valve means between said compression chamber and said reservoir having a relatively large unrestricted liquid flow capacity sufficient to accommodate free liquid flow from said reservoir to said compression chamber during the rebound stroke of said piston towards said closed cylinder end but preventing return passage of liquid from said compression chamber to said reservoir during the compression stroke of said piston towards said check valve means; the face of the piston which bounds the rebound chamber being provided with liquid conducting groove means defining a seat portion, said groove means having relatively unrestricted constantly open communication with said compression chamber through passages formed in said piston, annular disk valve means carried with said piston and having the inner peripheral portion thereof fixed axially relative to said piston and provided with an outer peripheral portion overlying said groove means and having a seat potion normally engaged with said piston seat portion, the first mentioned said piston seat portion being notched to provide, in cooperation with said overlying portion of said disk valve means, constantly open two-way liquid flow restricting shuttle passage means having one end thereof constantly open directly to the rebound chamber and having the other end thereof constantly open to the compression chamber through said groove means and said piston passages, said notched shuttle passage means being operative to restrict liquid interflow between said chambers on both the compression and rebound strokes of the piston to thereby cause the piston to perform useful resistance work on both strokes of the piston, said notched shuttle passage means having a liquid flow capacity sufficient to substantially fill said rebound chamber on all compression strokes of the piston and said annulus disk valve member operating during piston compression strokes and in response to predetermined pressure differential between said chambers to allow liquid flow from said piston passages and groove means thence between said disk valve member and said piston seat portion to the rebound chamber, liquid flow restricting escape passage means operative to restrict liquid flow from the compression chamber to the reservoir, said notched shuttle passage means having such liquid flow restricting capacity relative to the liquid flow restricting capacity of said escape passage means that only a minor portion of the compression resistance work during the compression stroke of the piston is effected by the flow resistance offered by said liquid escape passage means and the major portion of the compression resistance work is effected by the flow resistance offered by said notched shuttle passage means, all of the liquid displaced from said rebound chamber by all rebound strokes of the piston being passed only to said compression chamber and passing through said notched shuttle passage means and all of the liquid flowing to the rebound chamber during all compression strokes of the piston being passed only from said compression chamber through said groove means and through said notched shuttle passage means and through the space between said disk valve member and said piston seat portion by flexing of the outer peripheral portion of said disk valve member away from said piston seat portion.

DONALD T. BALL.

References Cited in the file of this patent

UNITED STATES PATENTS

| Number | Name | Date |
|---|---|---|
| Re. 23,421 | Whisler | Oct. 16, 1951 |
| 2,087,451 | Rossman et al. | July 20, 1937 |
| 2,107,974 | Bechereau et al. | Feb. 8, 1938 |
| 2,335,907 | Boor et al. | Dec. 7, 1943 |
| 2,432,937 | Rossman | Dec. 16, 1947 |
| 2,497,972 | Beecher | Feb. 21, 1950 |
| 2,546,038 | McIntyre et al. | Mar. 20, 1951 |
| 2,551,749 | Lewton | May 8, 1951 |